(12) United States Patent
Ohmori et al.

(10) Patent No.: US 6,227,063 B1
(45) Date of Patent: May 8, 2001

(54) AUTOMATICALLY OPERATED TRANSMISSION AND CONTROLLING METHOD THEREFOR

(75) Inventors: Makoto Ohmori, Nagoya; Nobuyuki Kodera, Okazaki, both of (JP)

(73) Assignee: Aisin AI Co., Ltd., Nishio (JP)

( * ) Notice: Subject to any disclaimer, the term of this patent is extended or adjusted under 35 U.S.C. 154(b) by 0 days.

(21) Appl. No.: 09/476,377

(22) Filed: Jan. 3, 2000

(30) Foreign Application Priority Data

Jan. 14, 1999 (JP) .................................. 11-008407

(51) Int. Cl.$^7$ .................................................. F16H 59/00
(52) U.S. Cl. .............................................................. 74/335
(58) Field of Search .................................................. 74/335

(56) References Cited

U.S. PATENT DOCUMENTS 5,099,711 * 3/1992 Langho et al. ........................... 74/335
5,261,288 * 11/1993 Menig ...................................... 74/335
5,974,354 * 10/1999 Janecke et al. .......................... 74/335

\* cited by examiner

Primary Examiner—Dirk Wright
(74) Attorney, Agent, or Firm—Burns, Doane, Swecker & Mathis, LLP

(57) ABSTRACT

The present invention related to an automatically operated transmission and a controlling method therefor, and intends to restore the shift-fall shortly and securely by detecting the shift-fall even in the synchronize area, push-apart area and the piece mesh area, in the predetermined condition.

The automatically operated transmission comprises a gear speed-changing mechanism 2; a synchromesh operating mechanism 30 including a sleeve 8 and a synchronizer ring 9; and an actuator 40, 50; a shifted amount detecting means 51 for detecting a shifted amount of the sleeve 8 of said synchromesh operating mechanism 30 from the neutral position to a set position D in the piece meshing area G by said actuator 40, 50; and controlling means 6 for operating said actuator 40, 50 when a fact that the sleeve 8 once reached to the shift completing position F is retracted therefrom, without a driver's shifting operation, by a retracted amount smaller than a predetermined position E in the piece meshing area G is detected by said shifted amount detecting means 51, to re-shift the sleeve toward the shift completing position.

9 Claims, 3 Drawing Sheets

AUTOMATICALLY OPERATED TRANSMISSION AND CONTROLLING METHOD THEREFOR

BACKGROUND OF THE INVENTION

1. Field of the Invention

This invention relates to an automatically operated speed-changing apparatus (transmission) of an automobile and an industrial vehicle. In particular, it relates to the automatically operated speed-changing apparatus in which an operating mechanism to change a gear speed changing mechanism for speed-changing is automatically operated by a hydraulically or electrically operated actuator, and a controlling method therefor.

2. Related Art

In a transmission of an automobile, there is an automatically operated transmission in which a speed-changing operation for changing combination of gears of a gear train is automatically carried out by an actuator of a hydraulic type or an electrical type, based on a driver's manual handling.

FIG. 4 shows one example of such automatically operated transmission which is comprised of a gear speed-changing mechanism 2, an operating mechanism for setting a predetermined speed-changing ratio by changing combination of meshing gears i.e. transmitting condition of the gear speed-changing mechanism 2, actuators 4 and 5 for hydraulically or electrically driving the operating mechanism 3, and a controlling means 6 for controlling the actuators 4 and 5, all of which are disposed in a speed-changing case 1. The controlling means 6 controls the actuators 4 and 5 based on a signal generated by handling of a manually operated shift member 7 such as a switch or lever. The controlling means 6 is constructed by a hydraulically controlled device when the actuators 4 and 5 are of hydraulically-operated type, while it is constructed by a ECU (Electrically Controlled Unit) when the actuators 4 and 5 are electrical motors.

The automatically operated transmission shown in FIG. 4 is for a manually operated transmission (manual transmission), so the gear speed-changing mechanism 2 is comprised of constantly meshed type gear train mounted on an input shaft, a counter shaft and an output shaft (driven shaft), and transmitting condition or combination of the gears thereof is changed by the operating mechanism 3 to set (shift) a predetermined speed-changing ratio.

The operating mechanism 3 is comprised of a synchromesh mechanism in which a relative braking is generated by a coned friction surface thereof, and a shift fork engaged with a sleeve of the synchromesh mechanism. The synchromesh mechanism is, as shown in FIG. 5, provided with the sleeve 8 which has inner peripheral splines 8a meshing with outer peripheral splines of a clutch hub (not shown), a synchronizer ring 9 of cone-shape and is pushed in an axial direction of X by the sleeve 8, and a key 10 fitted on an inner peripheral surface of the sleeve 8 centrifugally and pushes an end surface of the synchronizer ring 9 in the axial direction X in an initial period (this is called as "shift put-in area") of the shifting operation of the sleeve 8. The key 10 is positioned on the inner peripheral surface of the sleeve 8 to be rotated at a position offset toward one side of a groove of an outer peripheral tooth 9b of the synchronizer ring 9. Therefore, when the sleeve 8 is shifted in the axial direction x by the shift fork 12, as shown in FIG. 6, the sleeve 8 and the synchronizer ring 9 are opposed in a phase where a chamfered surface 8b of the inner peripheral splines 8 a and a chamfered surface 9a of the outer peripheral teeth 9b are offset in a circumferential direction.

That is, in the synchromesh mechanism, when the sleeve 8 positioned at the neutral position is shifted by the shift fork 12 in the axial direction X so that the key 10 presses the end surface of the synchronizer ring 9 in the axial direction X (shift push-in area), as shown in FIG. 6, the chamfered surface 8b of the sleeve 8 and the chamfered surface 9a of the synchronizer ring 9 regulate the inner peripheral splines 8a of the sleeve 8 and the outer peripheral gears 9b of the synchronizer ring 9 in a state where they are offset with each other by width of the key 10 (synchronize area). Thus, the sleeve 8 further shifts in the axial direction X to press the chamfered surface 9a of the synchronizer ring 9 by the chamfered surface 8b thereof, so that the inner peripheral splines 8a of the sleeve 8 put into the adjacent grooves of the outer peripheral teeth 9b of the synchronizer ring 9. This period is called as "push-apart area", and the push-apart completes when the number of rotations of a gear 11 coincides with that of the synchronizer ring 9 due to direct pushing by the sleeve 8 to the synchronizer ring 9. In state where the push-apart is completed, since the synchronizer ring 9 can be freely rotated, the sleeve 8 is shifted in the axial direction x by the shift fork 12 driven by the actuators 4 and 5, so that the inner peripheral splines 8a of the sleeve 8 put into the adjacent grooves of outer teeth 11a of the gear 11 (this period is called as "piece mesh area"), to complete the speed-changing.

The actuators 4 and 5 apply an axial load to a shift fork 12 of the operating mechanism 3, and a hydraulic cylinder or hydraulic motor is used as the hydraulic type actuator, while an electric motor is used as the electric type actuator. When the gear speed changing mechanism 2 is operated via the operating mechanism 3 by the actuators 4 and 5 of the hydraulic or electric type, the actuators 4 and 5 should assume position to press the sleeve 8 for maintaining the gear speed-changing mechanism 2 in a state where a predetermined speed-changing ratio is set. However, the axial load applied to the actuators 4 and 5 to press the sleeve 8 axially is relieved at the time when the shifting operation of the operating mechanism 3 including the sleeve 8 is completed, and the sleeve 8 is then retained at the present position by a ball-lock mechanism in the transmission.

However, if shock is applied to the vehicle due to sudden acceleration or deceleration of running speed, running on a rough (convex/concave) surface, or running over a step, load in a reverse direction to the force applied by the ball locking mechanism is applied to the sleeve 8 of the operating mechanism 3 which has reached to the shift completing position to retract the sleeve 8 to the piece-mesh area, the push-apart area or the synchronizing area to thereby cause "a shift-fall". In the shift fallen state, the gear speed-changing mechanism 2 becomes a neutral state where a gear rotating together with the output shaft freely rotates relative to the output shaft, so that the driver feels uneasiness due to unintentional running of the vehicle.

For restoring or returning the neutral state of the gear speed-changing mechanism 2 to the original shifted state automatically, the shift-fall of the synchromesh mechanism may possibly be detected by a stroke sensor disposed in the actuators 4 and 5 corresponding to the shift push-in area of the synchromesh mechanism, and the actuators 4 and 5 are operated again, based on the output of the actuators 4 and 5 for driving the operating mechanism 3. However, if the synchromesh mechanism is always driven again to the shift completing position based on detection of the synchromesh mechanism at the shift push-in area via the synchronizing area, the push-apart area and piece-mesh area, the driver is left in the unintentional running state for a long time.

SUMMARY OF THE INVENTION

The present invention is made in view of the above mentioned circumstances, and intends to provide an automatically operated transmission and a controlling method therefor, which can avoid occurrence of the neutral state of the gear speed changing mechanism due to the shift-fall of the operating mechanism, and can restore the shift-fall, if occurred, shortly and securely.

In order to achieve the above purpose, an inventor of the present invention has studied in many view points and found that the operating mechanism can be restored or returned to the present shifted state in a predetermined condition without passing through the shift push-in area, the synchronizing area and the push-apart area, by detecting the shift-fall in the piece-meshing area, a push-apart area and the synchronizing area, in addition to the shift push-in area.

That is, the automatically operated transmission of the present invention is comprised of 1) a gear speed-changing mechanism including an input shaft, a clutch hub and a gear train, 2) a synchromesh operating mechanism including a sleeve capable of shifting in an axial direction together with the clutch hub of said gear speed-changing mechanism and positioned at a neutral position in a neutral state of said gear speed-changing mechanism, and a synchronizer ring synchronizing with a predetermined gear of the gear train of said gear speed-changing mechanism by shifting of the sleeve from a shift put-in area to a synchronizing area, and completing the shifting of the sleeve in a piece-mesh area by freely rotating by the shifting of the sleeve from the synchronizing area to a push-apart area to allow meshing of the sleeve with the predetermined gear, 3) an actuator for driving the sleeve of said synchromesh operating mechanism from the neutral position to a synchronization completing position via the shift push-in area, the synchronizing area, the push-apart area and the piece mesh area, 4) a shifted amount detecting means for detecting a shifted amount of the sleeve to a set position located between the shift complete position and the neutral position by said actuator, or amount equivalent thereto, and 5) controlling means for operating said actuator, when a fact that the sleeve of said synchromesh operating mechanism once reached to the shift completing position is retracted therefrom, without a driver's shifting operation, by a retracted amount smaller than a predetermined position in the piece meshing area is detected by said shifted amount detecting means, to re-shift the sleeve toward the shift completing position.

In the automatically operated transmission and the controlling method therefor, in the shifted state of the predetermined speed-changing ratio, whether the retracted position of the sleeve of the synchromesh type operating mechanism from the shift completing position is smaller or larger than the set position (shift-fall detecting position) set in the area between the shift completing position and the neutral position or not, is detected by the shifted amount detecting means. When the shifted amount detecting means detects that the retracted position of the sleeve is larger than the set position, the controlling means judges whether the sleeve retraction is resulted from the driver's handling of the shifting lever or not. If the sleeve retraction is resulted from an external cause, other than the driver's shift lever handling, that means, cause of the shift-fall may reside in the operating mechanism, the actuator is controlled to operate the operating mechanism to thereby shift the sleeve to the shift completing position under predetermined condition (the retracted amount of the sleeve is smaller than the piece meshing point E), without returning the sleeve to the neutral position. Thus, the time in which the gear speed-changing mechanism is positioned in the neutral state can be removed to attenuate or reduce the driver's uneasy feeling.

The automatically operated transmission of the present invention can have following embodying modes.

As the actuator for driving the synchromesh type operating mechanism, a hydraulic actuator such as hydraulic cylinder or hydraulic motor, or an electric motor can be used. As the detecting means for detecting a shifted amount of the sleeve of the synchromesh type operating mechanism or the amount equivalent thereto, a stroke sensor for detecting position or shifted amount of a moving member such as a shift fork in the actuator, or a position sensor for detecting position or shifted amount of the sleeve, can be used. The controlling means for controlling the actuator in the predetermined condition can be a ECU which has a program stored therein or an extra electric circuit. The controlling means controls the actuator so that the sleeve of the synchromesh type operating mechanism is shifted again or re-shift without returning to the neutral position, when the retracted amount of the sleeve or the like detected by the shifted amount detecting means corresponds to the piece meshing area; but it controls the actuator so that the sleeve is returned to the neutral position for the shift-fall and then shifted again to the present shifted position, when the detected retracted amount of the sleeve or the like corresponds to the push-apart area, the synchronizing area or the shift push-in area.

PREFERRED EMBODIMENT OF THE INVENTION

Next, a preferred embodiment of the present invention will be explained with reference to the attached drawings. However, it is noted that the present invention can include various modifications or deformations without departing from a sprit of the present invention.

Figure 1:
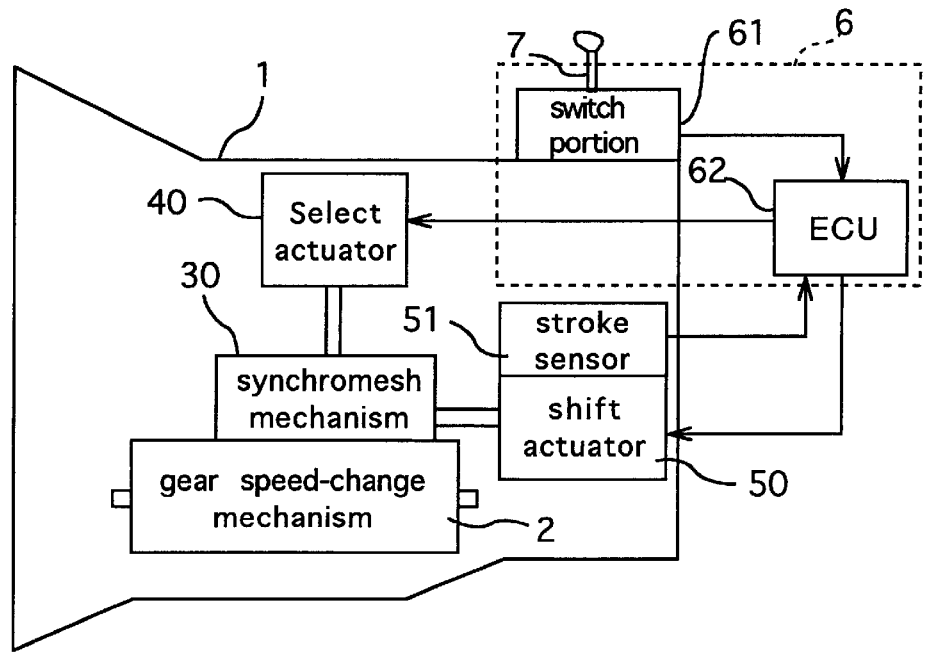
FIG. 1 is a constructive view for showing one example of the present invention.

As shown in FIG. 1, an automatically operated transmission is comprised of a gear speed-changing device 2, a synchromesh mechanism (operating mechanism) 30, a shift actuator 50, a select actuator 40, and a controlling means 6.

The gear speed-changing mechanism 2 includes an input shaft, a counter shaft and an output shaft (driven shaft); and a gear train mounted on each of the shafts and held in a constantly meshed condition. The gear train is mounted on the output shaft freely rotatable relative thereto. The gear speed-changing mechanism 2 is operated by the synchromesh mechanism 30 so that a predetermined gear of the gear train rotates together with the output shaft, thereby setting a predetermined speed-changing ratio in the gear speed-changing mechanism 2.

Figure 5:
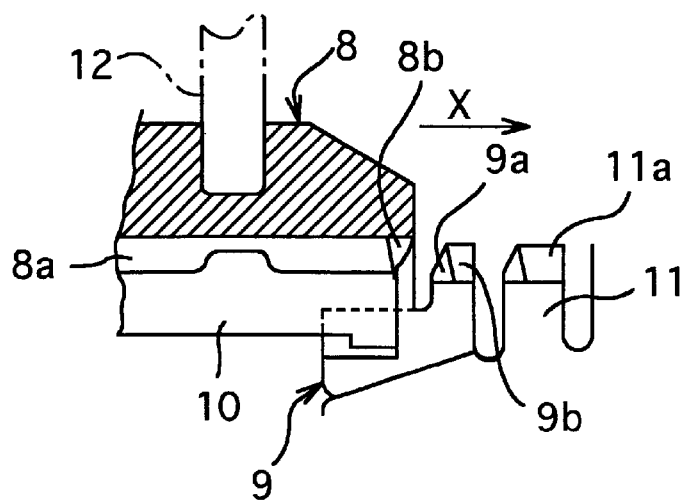
FIG. 5 is an explanatory view for explaining operation of the synchromesh type operating mechanism.

In detail, the synchromesh mechanism 30 is, as explained with reference to FIG. 5 provided with the sleeve 8 which has inner peripheral splines 8a meshing with outer peripheral splines of a clutch hub (not shown), a synchronizer ring 9 of cone-shape and is pushed in an axial direction of X by the sleeve 8, and a key 10 fitted on an inner peripheral surface of the sleeve 8 centrifrigally and pushes an end surface of the synchronizer ring 9 in the axial direction X.

On account of the above construction of the synchromesh mechanism 30, in the shift push-in area where the sleeve 8 positioned at the neutral position in the neutral state of the gear speed-changing mechanism 2 starts to shift in the axial direction X by the shift fork 12, the synchronizer ring 9 is pressed in the axial direction X by the key 10. As a result, the rotational speed of the synchronizer ring 9 comes near to that of the sleeve 8, so that the inner peripheral splines 8a of the sleeve 8 can go into or enter the adjacent grooves of the outer peripheral teeth 9b of the synchronizer ring 9 in the final stage of the synchronizing area. By further axial shifting of the sleeve 8 by the shift fork 12, the sleeve 8 reaches to the push-apart area to push the chamfered surface 9a of the synchronizer ring 9 by the chamfered surface 8b thereof. Thus, the synchronizer ring 9 applies a large frictional force to the coned surface of the gear 11, so that the rotational speed of the synchronizer ring 9 becomes equal to that of the sleeve 8. This is completion of the synchronization.

As a result, since the synchronizer ring 9 freely rotates and does not hinder shifting of the sleeve 8, the sleeve 8 shifts in the X-direction to pass the synchronizer ring 9 and to mesh with outer peripheral teeth 11a of the gear 11 (piece-mesh area). Thus, the sleeve 8 completes the shifting operation. The position of the sleeve 8 to mesh with the outer peripheral gear 11a of the ring 1 1 is called as "piece meshing point E" (refer to FIG. 3).

The shift actuator 50 of FIG. 1 drives (shifts) the sleeve 8 in the synchromesh mechanism 30 in the axial direction X, and is comprised of an electric motor. For example, a rack (moving member) meshed with a pinion attached to an output shaft of the electric motor is connected to the shift fork 12 to shift the sleeve 8 in the axial direction X. Also, the shift actuator 50 is provided with a stroke sensor 51 for detecting or measuring an actual shifted amount of the rack to detect the position or the shifted amount of the sleeve 8 from the neutral position based on the shifted amount of the rack. The stroke sensor 51 judges position of the sleeve 8 (shift push-in area, synchronize area, push-apart area and piece-mesh area) by a stroke and an inputted rotation data thereof. The stroke sensor 51 transmits a signal about shifting of the sleeve 8 to the ECU 62 in the controlling means 6 to be explained later. A sensor for accumulating the number of rotations of the electric motor can be used, instead for the stroke sensor 51.

The select actuator 40 selects the synchromesh mechanism 30 corresponding to the speed-changing ratio set by the gear speed-changing mechanism 2, and it can be omitted if the shift actuator 50 is provided for each of the shift forks. The select actuator 40 is provided when there is the select shaft selectively connected therewith, and in this case, the shift actuator 50 shifts the select shaft. In the following, the construction in which the shift actuator 50 is provided for each shift fork and the ECU 62 controls only the shift actuator 50 will be explained.

The controlling (compensating) means 6 is comprised of an electrically controlling device which includes a switching portion 61 provided with a shift lever 7, and a ECU 61. The switch portion 61 has contacting portions respectively corresponding to each speed-changing ratio, a contacting portion corresponding to the neutral position and a contacting portion corresponding to backward shift, and it transmits switching signals from each of the contacting portions to ECU 62. The ECU 62 is a computer which has a basic program to carry out the shift control for the speed-changing ratio based on the switching signals from the switching portions 61, and a control or assist program to attend the shift-fall, and it transmits driving signal to the shift actuator 50 to operate it based on the basic and control programs.

Figure 3:
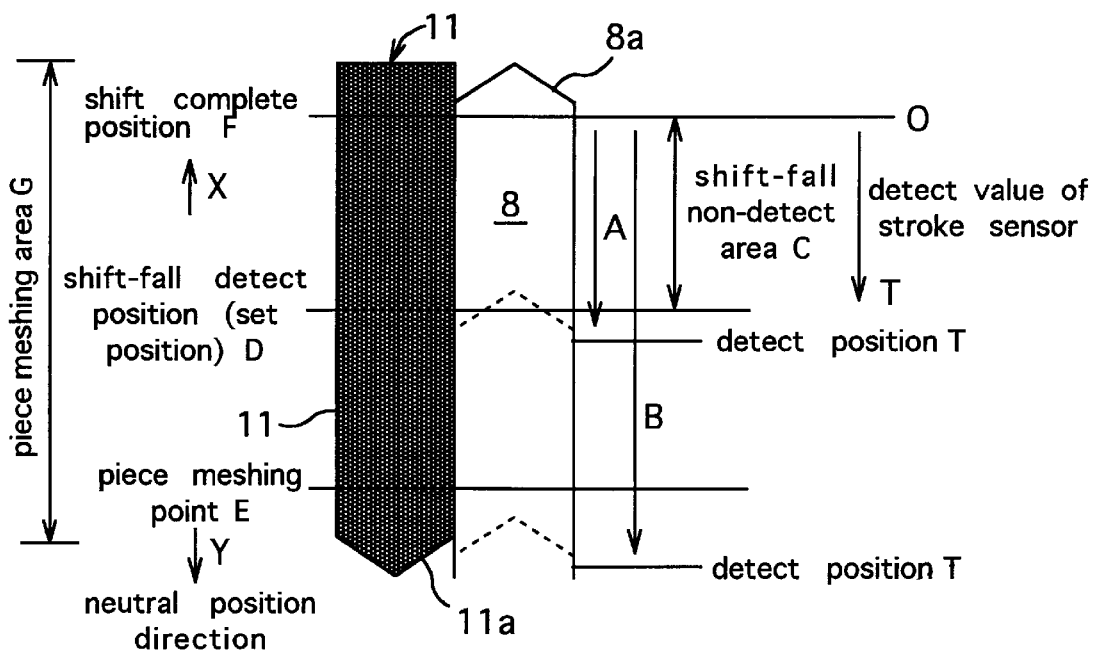
FIG. 3 is an explanatory view of the above embodiment.

The ECU 62 has, as shown in FIG. 3, a memory in which a shift-fall detecting point D of the sleeve 8 and a piece meshing point E where the sleeve 8 and the gear 11a of the ring 11 after completion of the push-apart are meshed each other are memorized. The shift-fall detecting point D is a set value setted corresponding to the positional shifted amount of the sleeve 8 at an arbitrary point from the piece meshing point E to the shift completing point F, and it is selected at an intermediate portion between the shift completion point F and the piece meshing point E. However, it can be selected as a point nearer to the piece meshing point E or to the shift completing point. The shift-fall detecting point D and the piece-mesh point E can be coincided. In any way, if the fact that the sleeve 8, once reached to the shift completing point F, retracts therefrom to shift backward beyond the shift-fall detecting point D toward the neutral position is detected by the stroke sensor 51, the ECU 62 of the controlling means 6 judges the shift-fall has occurred in the synchromesh mechanism 30. However, as explained later, the sleeve 8 is not retracted to the neutral position when the detected position T is located between the shift completing position F and the piece meshing point E. An area from the piece meshing point E to the shift completion position F corresponds to a piece meshing area G. This piece meshing area G is provided to maintain a meshed length between the sleeve 8 and the gear 11. The stroke sensor 51 also measures the retracted amount of the sleeve 8 from the shift completion position F.

The ECU 62 carries out a re-shift operation of the synchromesh mechanism after the shift completion 30 based on the controlling program, in addition to the shifting operation of the sleeve 8 in the shift put-in area, synchronizing area, push-apart area and piece-mesh area carried out based on the basic program. The re-shift operation is carried out when the position or shifted amount of the sleeve 8 detected by the stroke sensor 51 belongs to a predetermined area.

Next, the controlling step carried out by the ECU 62 will be explained based on the flow-chart shown in FIG. 2.

Figure 2:
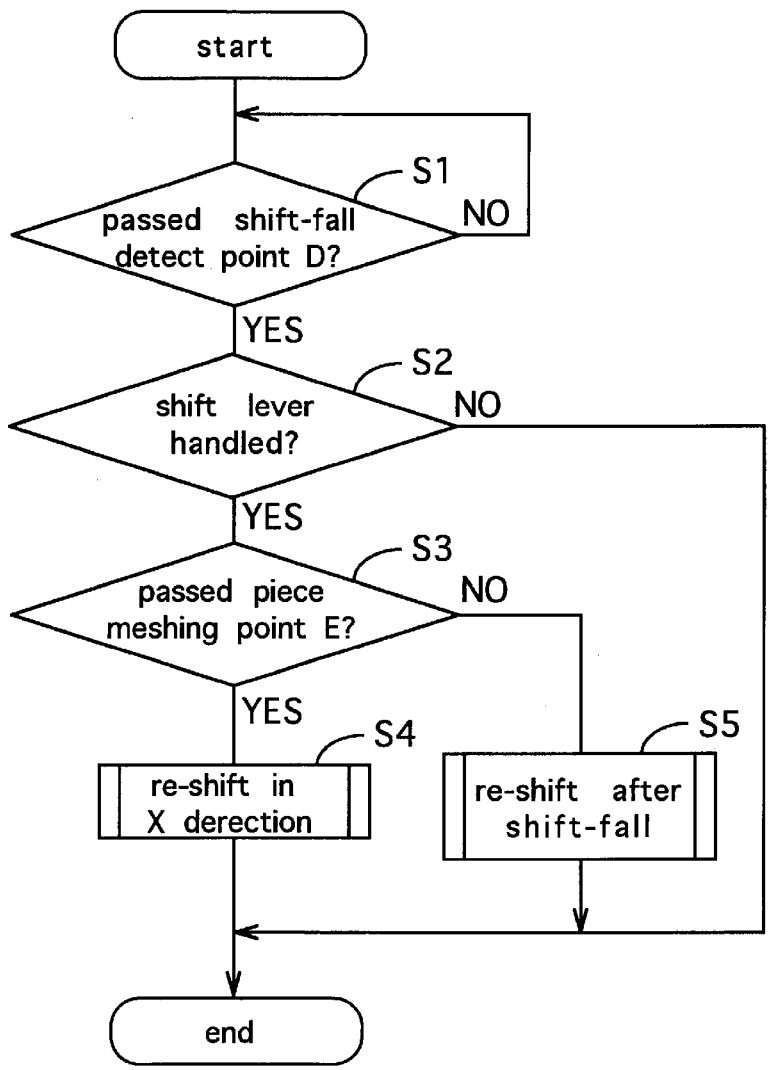
FIG. 2 is a flow-chart for explaining an operation of the above embodiments.

The ECU 62, after completion of the shift by the shift actuator 50 in the normal shifting operation (refer to the shift completion position F in FIG. 3), carries out the controlling program of FIG. 2. This controlling program has a judging process including a step sl ("sleeve 8 shifted beyond shift-fall detecting point D?"), a step S2 ("manual shift lever 7 handled?") and a step S 3 ("sleeve 8 shifted beyond piece meshing point E?").

As shown in FIG. 3, the ECU 62 reads in a present position or retracted amount of the sleeve 8 from the shift completion position F (hereinafter, simply referred to as "detected position T") detected by the stroke sensor 51, at the step S1, to compare it with the shift-fall detecting point D stored in the memory, that is, to judge whether the detected position T is larger than the shifted-fall detecting point D or not. If the judgement at the step S1 is NO, which means no shift-fall has occurred (refer to area C of rig. 3), the sequence returns to the basic program. If there is no shift-fall in the synchromesh mechanism 30, only the step S1 is carried out.

To the contrary, if the judgement at the step S1 is YES, which means a value A of the detecting position T is located at the area shifted toward the neutral position beyond the shift-fall detecting point D, the ECU 62 judges the shift-fall of the sleeve 8 has occurred. The ECU 62, after having judged occurrence of the shift-fall, judges whether the shift-fall is resulted from the handling operation of the manual shift lever 7 by the driver or not, based on a signal from the switching portion 61, at the step S2. If the judgement at the step S3 is NO, which means the shift-fall is resulted from the driver's shifting operation, the sequence returns to the basis program.

On the other hand, when the judgement at the step S2 is YES, which means the shift-fall is recognized, there is possibility the shift-fall has occurred in the synchromesh mechanism 30, so the value of the detecting position T and the piece meshing point E in the memory is compared, at a step S3. The reason for such comparison is that the detecting point T is not necessarily detected in the piece meshing area G, but may be detected in an area before the piece meshing area G (push-apart area or synchronize area corresponding to a value B) or in the shift push-in area (corresponding to a point shifted toward the neutral position beyond the point of the value B). In the niece meshing area G, since the mesh-apart has already completed, and the inner peripheralsplines 8a of the sleeve 8 mesh with the outer peripheral gears 11a of the gear 11, there is no problem to shift the sleeve 8 in the axial direction by the shift actuator 50.

To the contrary, when the detecting position T is detected in the area before the piece meshing area G (the push-apart area or the synchronizing area), if the sleeve 8 is shifted in the axial direction x by the actuator 50 toward the shift completing position F, the sleeve 8 passes by the synchronizing ring 9, without an axial pushing or pressing of the chamfered surface 9a by the chamfered surface 8b, so that the sleeve 8 meshes with the gear 11 in state where difference of the number of rotations resides therebetween. As a result, not only the sleeve 8 and the gear 11 are not pushed apart or synchronized, but gear noise occurs. This hinders the smooth re-shift of the sleeve 8 and may cause breakage of the inner peripheral splines 8a and/or the outer peripheral gears 11a.

In this embodiment, in order to avoid above disadvantage and to re-shift the sleeve 8 even in the push-apart area and piece meshing area, the ECU 62 has the steps S3 to S5. The step S3 carries out, depending on whether the detecting position T having passed beyond the shift-fall detecting point D passes beyond the piece meshing point E or not, different processes. That is, if the judgement of the step S3 is YES, which means the detecting position T does not pass beyond the piece meshing point E and is located between the piece meshing point E and the shift-fall detecting point D and has the value A (the detected position T is larger than the shift-fall detecting point D and is smaller than the piece meshing position E), the sequence advances to a step S4 ("re-stroke in X-direction"). At the step 4, because the push-apart by the sleeve 8 has been already completed and the inner peripheral splines 8b of the sleeve 8 mesh with the outer peripheral gears 11a of the gear 11, the sleeve 8 can be shifted in the axial direction X for re-shifting without causing any problem. Accordingly, the ECU 62 supplies the driving signal to the shift actuator 50 to shift the sleeve 8 in the axial direction X, thereby carrying out the re-shift operation. In this way, the shift-fall at the meshing area G due to external reason can be prevented.

On the other hand, the judgement at the step S3 is NO, which means the detecting point D passes beyond the piece meshing point E and is located in the synchronizing area and has the value B or the push-apart area or synchronize area, the sequence advances to a step S5 ("re-shift after shift-fall"). At the step S5, because the push-apart by the sleeve 8 has not been completed yet, the sleeve 8 is retracted to position before the shift push-in, and then advanced or re-shifted. That is, the ECU 62 supplies the driving signal to press the sleeve 8 in the axial direction X to the shift actuator 50 for re-shifting, after supplying the driving signal to press the sleeve 8 to the neutral position direction Y to the shift actuator 50 for shift-falling. In this way, even when the shift-fall occurs in the push-apart area or the synchronizing area, the shifting condition can be returned to the original shifting condition without generating the gear noise.

Figure 6:
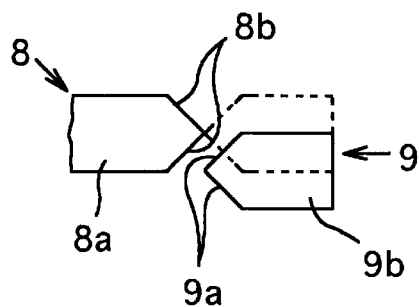
FIG. 6 is an explanatory view for explaining relation between a sleeve and a synchronizer rig.
Figure 4:
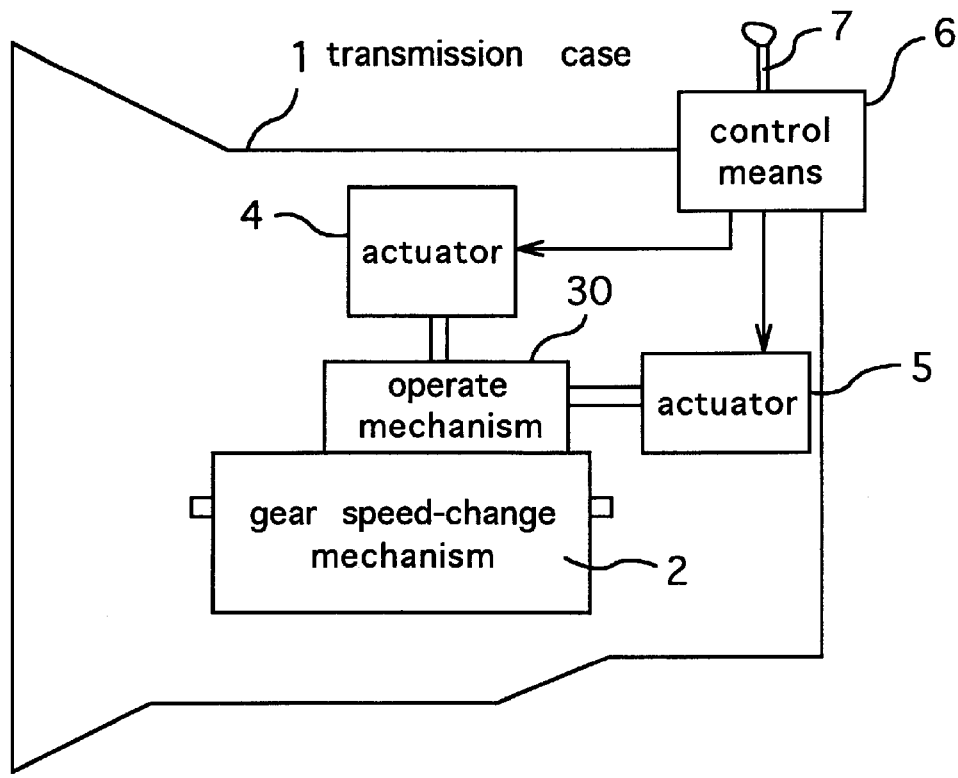
FIG. 4 is a constructive view for explaining outline of an automatically operated transmission.

As mentioned above, when the shift-fall of the sleeve 8 is detected in the push-apart area or the synchronizing area, by re-shifting the sleeve 8 from the neutral position toward the shift completing position F, the inner peripheral splines 8a of the sleeve 8 and the outer peripheral splines 9b of the synchronizing ring 9 abut each other at the chamfered surfaces 8b and 9a in a correct position, as shown by a solid line in FIG. 6. Thus, the re-shifting of the sleeve 8 can be carried out smoothly.

Here, the above control means 6 can be constructed by the hydraulic controlling device which operates the shift actuator 50 sequentially based on the detection of shift-fall, in the same manner as above electric controlling device.

What is claimed is:

1. An automatically operated transmission for a vehicle, comprising:

a gear speed-changing mechanism including an input shaft, a clutch hub and a gear train;

a synchromesh operating mechanism including a sleeve capable of shifting in an axial direction together with the clutch hub of said gear speed-changing mechanism and positioned at a neutral position in a neutral state of said gear speed-changing mechanism, and a synchronizer ring synchronizing with a predetermined gear of the gear train of said gear speed-changing mechanism by shifting of the sleeve from a shift put-in area to a synchronizing area, and completing the shifting of the sleeve in a piece-mesh area by freely rotating by the shifting of the sleeve from the synchronizing area to a push-apart area to allow meshing of the sleeve with the predetermined gear;

an actuator for driving the sleeve of said synchromesh operating mechanism from the neutral position to a synchronization completing position via the shift push-in area, the synchronizing area, the push-apart area and the piece mesh area;

a shifted amount detecting means for detecting a shifted amount of the sleeve to a set position located between the shift complete position and the neutral position by said actuator, or amount equivalent thereto; and controlling means for operating said actuator, when a fact that the sleeve of said synchromesh operating mechanism once reached to the shift completing position is retracted therefrom, without a driver's shifting operation, by a retracted amount smaller than a predetermined position in the piece meshing area is detected by said shifted amount detecting means, to re-shift the sleeve toward the shift completing position.

2. An automatically operated transmission according to claim 1, wherein said controlling means, when a fact that the retracted amount of the sleeve of said synchromesh operating mechanism without the driver's handling is larger than the predetermined position in the piece meshing area is decked by said shifted amount detecting means, operates said actuator to re-shift the sleeve to the shift completing position after returning the sleeve once to the neutral position.

3. An automatically operated transmission according to claim 1, wherein said shifted amount detecting means detects a retracted amount of the sleeve of said synchromesh operating mechanism from the shift completing position to the piece-mesh area, and the predetermined position in the piece-mesh area is a piece meshing point.

4. An automatically operated transmission according to claim 1, wherein said shifted amount detecting means further detects a retracted -mount of the sleeve of said synchromesh operating mechanism from the shift completing position to the push-apart area or synchronizing area.

5. An automatically operated transmission according to claim 4, wherein said controlling means further operates said actuator, when said shifted amount detecting means detects the retracted amount of the sleeve from the shift completing position to the push-apart area or the synchronizing area, to re-shift the sleeve to the shift completing position, after retracting the sleeve once to the neutral position.

6. An automatically operated transmission according to claim 3, the set position in the piece meshing area of the sleeve of said synchromesh operating mechanism selected at an intermediate position of the piece meshing area, said controlling means not operating said actuator when a fact that the retracted position of the sleeve is located between the shift completing position and the set position is detected by said shifted amount detecting means.

7. An automatically operated transmission according to claim 1, wherein the amount equivalent to the shifted amount of the sleeve of said synchromesh operating mechanism to the set position between the shift completing position and the neutral position, is a rotated amount of an electric motor or shifted amount of a moving member of said actuator corresponding to the shifted amount of the sleeve.

8. An automatically operated transmission according to claim 1, wherein said controlling means includes a manually handled shifting lever and a ECU, and the ECU memorizing the set position in the piece meshing area and a piece meshing point as the predetermined position.

9. A controlling method for controlling, in an automatically operated transmission including a gear speed-changing mechanism including an input shaft, a clutch hub and a gear train; a synchromesh operating mechanism including a sleeve capable of shifting in an axial direction together with the clutch hub of said gear speed-changing mechanism and positioned at a neutral position a neutral state of said gear speed-changing mechanism, and a synchronizer ring synchronizing with a predetermined gear of the gear train of said gear speed-changing mechanism by shifting of the sleeve from a shift push-in area to a synchronizing area, and completing the shifting of the sleeve in a piece-meshed area by freely rotating by the shifting of the sleeve from the synchronizing area to a push-apart area to allow meshing of the sleeve with the predetermined gear; and an actuator for driving the sleeve of said synchromesh operating mechanism from the neutral position to a synchronization completing position via the shift push-in area, the synchronizing area, push-apart area and the piece meshing area, the shifting of the sleeve by a controlling means including a ECU, comprising steps of:

a step for sensing whether the sleeve once reached to the shift completing position is retracted therefrom by a retracted amount larger than the predetermined position in the piece meshing area or not;

a step for detecting whether a shifting operation by a driver to operate said actuator and the synchromesh operating mechanism is handled or not;

a driving step for driving said actuator to re-shift the sleeve toward the shift completing position after returning the sleeve once to the neutral position when the retracted position of the sleeve sensed at said sensing step is larger than the predetermined position in the piece meshing area, and for driving said actuator to re-shift the sleeve toward the shift completing position when the retracted position of the sleeve sensed at said sensing step is smaller than the predetermined position in the piece meshing area.

* * * * *